(12) United States Patent
Hughes

(10) Patent No.: US 10,338,574 B2
(45) Date of Patent: Jul. 2, 2019

(54) SYSTEM AND METHOD FOR IDENTIFYING MANUFACTURED PARTS

(71) Applicant: Raytheon Company, Waltham, MA (US)

(72) Inventor: David Hughes, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 716 days.

(21) Appl. No.: 14/859,896

(22) Filed: Sep. 21, 2015

(65) Prior Publication Data

US 2017/0083011 A1    Mar. 23, 2017

(51) Int. Cl.
   *G05B 19/41* (2006.01)
   *G05B 19/42* (2006.01)
   *G05B 19/418* (2006.01)

(52) U.S. Cl.
   CPC ............ *G05B 19/41875* (2013.01); *G05B 2219/31477* (2013.01); *G05B 2219/32368* (2013.01); *Y02P 90/14* (2015.11); *Y02P 90/22* (2015.11); *Y02P 90/26* (2015.11)

(58) Field of Classification Search
   CPC ......................................... G05B 2219/31477
   USPC ........................................................ 702/81
   See application file for complete search history.

(56) References Cited

U.S. PATENT DOCUMENTS

| | | | | |
|---|---|---|---|---|
| 2006/0039598 A1* | 2/2006 | Kim | ............ | G01N 21/21 382/145 |
| 2009/0210183 A1* | 8/2009 | Rajski | ............ | G01R 31/01 702/84 |
| 2016/0097728 A1* | 4/2016 | Engelbart | ............ | G05B 19/41875 356/237.2 |

* cited by examiner

*Primary Examiner* — Moazzam Hossain
*Assistant Examiner* — Omar F Mojaddedi
(74) *Attorney, Agent, or Firm* — Schwegman Lundberg & Woessner, P.A.

(57) ABSTRACT

A system and method can identify manufactured parts. A user can select a particular manufactured part, which can be out-of-specification. The system can retrieve test data for the selected part and for other manufactured parts. The system can normalize the retrieved test data against historical means and historical standard deviations to form normalized test data. The system can correlate the normalized test data for the selected part against normalized test data for each of the other manufactured parts to form correlation values. The system can display the correlation values with identifiers corresponding to the manufactured parts. Each correlation value can represent a degree of similarity between the selected part and a respective manufactured part. The manufactured parts with the highest correlation values can have the same failure mechanism as the selected part, which can help diagnose why the selected part can be out-of-specification.

12 Claims, 7 Drawing Sheets

500

```
SELECT y.TestStartTime, y.UUTSN, y.testStatus as [Result],
count(*) as [Base pCode Count],
(COUNT(*)*SUM(x.NomVal*y.NomVal)-
(SUM(x.NomVal)*SUM(y.NomVal)))
/
( SQRT(COUNT(*)*SUM(SQUARE(x.NomVal))-
SQUARE(SUM(x.NomVal)))
*
SQRT(COUNT(*)*SUM(SQUARE(y.NomVal))-SQUARE(SUM(y.NomVal)))
) as [Correlation]
from (
select ps.parmId, (ss.Mean - v)/ss.Deviant as [NomVal]
from parmSum ps
    join sumStats ss on ss.parmId=ps.parmId
    where TestOccurID = 160749 and ss.Deviant!=0) x
join (
select (ss.Mean - pCodes.v)/ss.Deviant as [NomVal],
pCodes.parmId, Tests.TestOccurID, Tests.TestStartTime,
Tests.UUTSN, Tests.testStatus
from testOccur [Tests]
    join parmSum pCodes on
pCodes.testOccurId=Tests.testOccurId
join sumStats ss on ss.parmId=pCodes.parmId
where ss.Deviant!=0 )  y ON y.parmId=x.parmId
group by y.TestOccurID,y.TestStartTime, y.UUTSN,
y.testStatus
order by 5 desc
```

FIG. 5

SYSTEM AND METHOD FOR IDENTIFYING MANUFACTURED PARTS

TECHNICAL FIELD

The present disclosure relates to a system and method that can identify manufactured parts, and can optionally identify out-of-specification manufactured parts that have the same failure mechanism.

BACKGROUND

In a manufacturing environment, inspection systems can measure and store values of various physical properties of each manufactured part. Many of these inspection systems can flag a manufactured part as being out-of-specification if at least one of its physical properties is found to be outside a specified range, but cannot use the measurements of the physical properties to help diagnose why the part is out-of-specification.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

FIG. 5 shows an example of a portion of computer code, which can perform a correlation calculation, in accordance with some embodiments.

DETAILED DESCRIPTION

A system and method can identify manufactured parts. A user can select a particular manufactured part, which can be out-of-specification. The system can retrieve test data for the selected part and for other manufactured parts. The system can normalize the retrieved test data against historical means and historical standard deviations to form normalized test data. The system can correlate the normalized test data for the selected part against normalized test data for each of the other manufactured parts to form correlation values. The system can display the correlation values with identifiers corresponding to the manufactured parts. Each correlation value can represent a degree of similarity between the selected part and a respective manufactured part. The manufactured parts with the highest correlation values can have the same failure mechanism as the selected part, which can help diagnose why the selected part can be out-of-specification.

As a specific example, consider a manufactured item in which a screw connects two elements. Under normal manufacturing conditions, the screw is tightened to a torque within a specified range. In one example of a failure mode, the screw can be over-tightened during the assembly process, which can distort the attached elements in the vicinity of the screw. An inspection system may be able to detect such a distortion, such as in a thickness measurement taken close to the over-tightened screw, and can flag the item as being out-of-specification for having too small a thickness in the detected area.

In some examples, the system and method discussed in detail below can be used to help diagnose an underlying cause of why a flagged item is out-of-specification. The system and method can identify multiple parts having the same failure mechanism. An operator can use information from the identified parts to help diagnose the underlying cause of the manufacturing errors. For instance, the system and method can identify that the screw overtightening errors occur on parts assembled on Wednesdays, and an operator can use that knowledge to locate an erroneous torque value in a configuration file that is updated on Tuesday nights. This is but one example; the system and method can help diagnose other issues as well. In other examples, the system and method discussed in detail below can be used to help diagnose issues with parts that are within specification.

The preceding paragraphs are but a summary of one example of a suitable system method that can identify manufactured parts, and are not intended to be limiting in any way. Other suitable examples are described in detail below.

Figure 1:
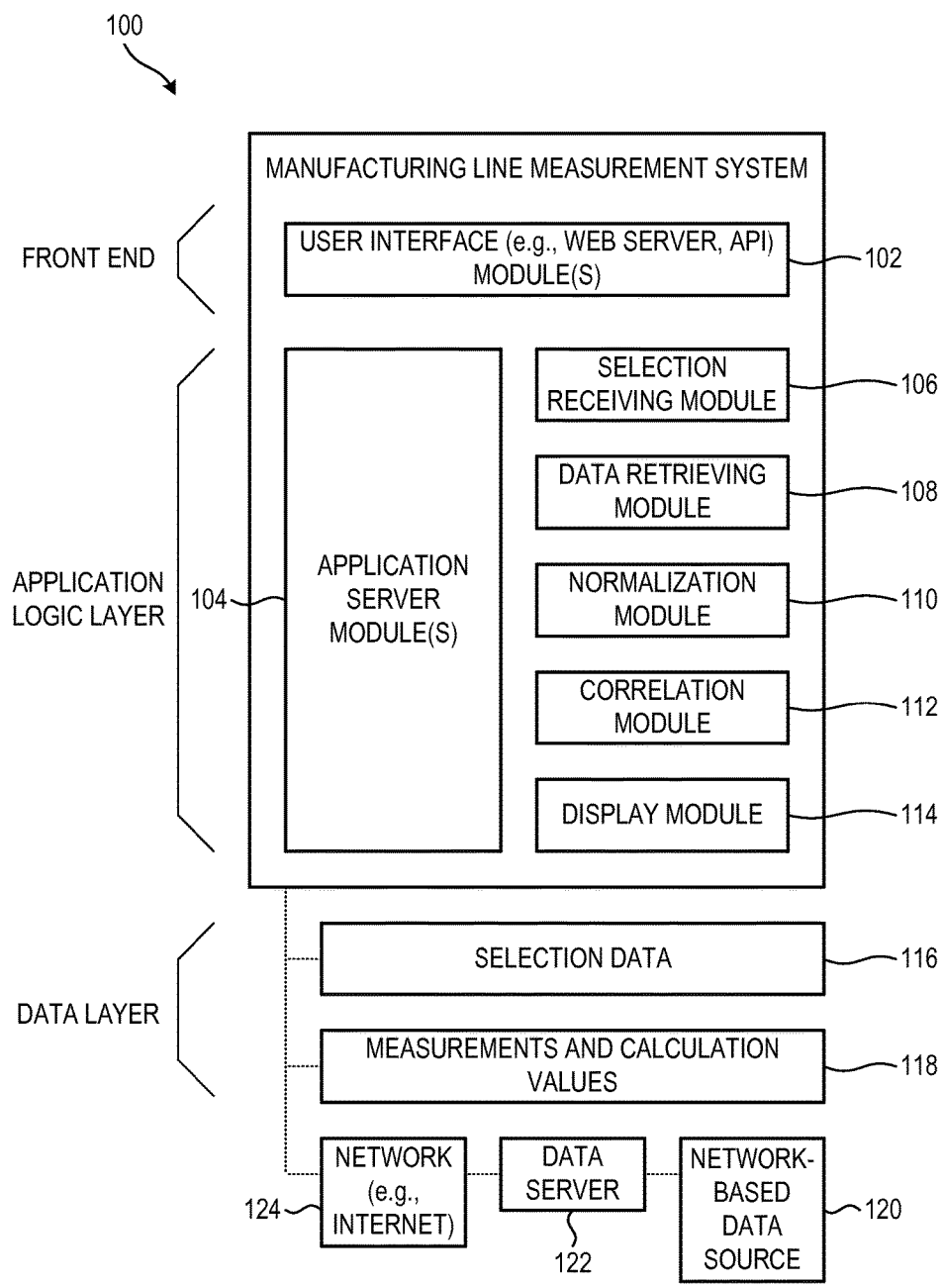
FIG. 1 is a block diagram showing the functional components of a system that can identify manufactured parts, in accordance with some embodiments.

FIG. 1 is a block diagram showing the functional components of a system 100 that can identify manufactured parts, in accordance with some embodiments. In some examples, system 100 can be a manufacturing line measurement system, which can take and log measurements of various physical properties of each manufactured part. In some examples, system 100 can include a server configured to store test data for a plurality of manufactured parts. The plurality of manufactured parts can have the same nominal physical properties and differ from one another due to manufacturing imperfections. The test data can include a plurality of numerical values for each manufactured part. The system 100 is but one example; other suitable systems can also be used.

As shown in FIG. 1, a front end may comprise a user interface module (e.g., a web server) 102, which receives requests from various client-computing devices, and communicates appropriate responses to the requesting client devices. For example, the user interface module(s) 102 may receive requests in the form of Hypertext Transport Protocol (HTTP) requests, or other network-based, application programming interface (API) requests (e.g., from a dedicated social networking service application running on a client device).

User interface module 102 can provide a user interface to a user. The user interface can include user interface elements to allow for selections from the user. For instance, the user interface can include one or more boxes that accept input from a user, one or more selectable boxes that allow a user to select one or more specified options, one or more ranking controls that allow a user to sort a list of results as a function of one or more selectable parameters and allow sorting as increasing or decreasing for the selected parameter, and other suitable user interface elements.

An application logic layer may include one or more various application server modules 104, which, in conjunction with the user interface module(s) 102, generate various graphical user interfaces (e.g., web pages) with data retrieved from various data sources in the data layer. With some embodiments, application server module 102 is used to implement the functionality associated with various applications and/or services provided by the manufacturing line measurement system as discussed above.

The application logic layer can include a selection receiving module 106 configured to receive from the user, on the user interface, a selection of a selected manufactured part, from the plurality of manufactured parts. In some examples, the user can select an identifier of a particular part from a menu of identifier. In some examples, the user can enter the identifier directly into the user interface.

The application logic layer can include a data retrieving module 108 configured to retrieve, from the server, test data for the plurality of manufactured parts. The test data can include a plurality of numerical values for each manufactured part. Each numerical value can correspond to a measurement of a particular physical property of the manufactured part, such as a thickness at a particular location, a size, a linear dimension at a particular location, a reflectivity at a particular location, and so forth.

The application logic layer can include a normalization module 110 configured to normalize the retrieved test data against respective historical means and respective historical standard deviations to form normalized test data. As will be discussed below, such normalization can prevent skewing of the retrieved data from physical properties having relatively large mean values and relatively small standard deviations.

The application logic layer can include a correlation module 112 configured to correlate the normalized test data for the selected manufactured part with the normalized test data for each of the other manufactured parts in the plurality to form a plurality of correlation values. Each correlation value can represent a degree of similarity between the selected manufactured part and a respective manufactured part of the plurality.

The application logic layer can include a display module 114 configured to display, on the user interface, at least one of the plurality of correlation values and at least one identifier of a respective manufactured part. Display module 114 can include one or more user interface elements that can accept input from the user. An example of a user interface is shown in FIG. 5 and discussed below in detail.

A data layer can include selection data 116, which includes data selected by a user from the user interface 102 and data received from the selection receiving module 106. Data layer can further include measurements and calculation values 118, which can include numerical values stored on one or more memory devices and accessible by any of modules 102-114.

The modules 102-114 can communicate with one or more network-based data sources 120, through one or more data servers 122, over a computer network 124 using standard network communication protocols and can programmatically (e.g., through an Application Programming Interface, abbreviated as API) access the network-based data source. In other examples, modules 102-114 can access a public user interface (e.g., an HTML page).

Figure 2:
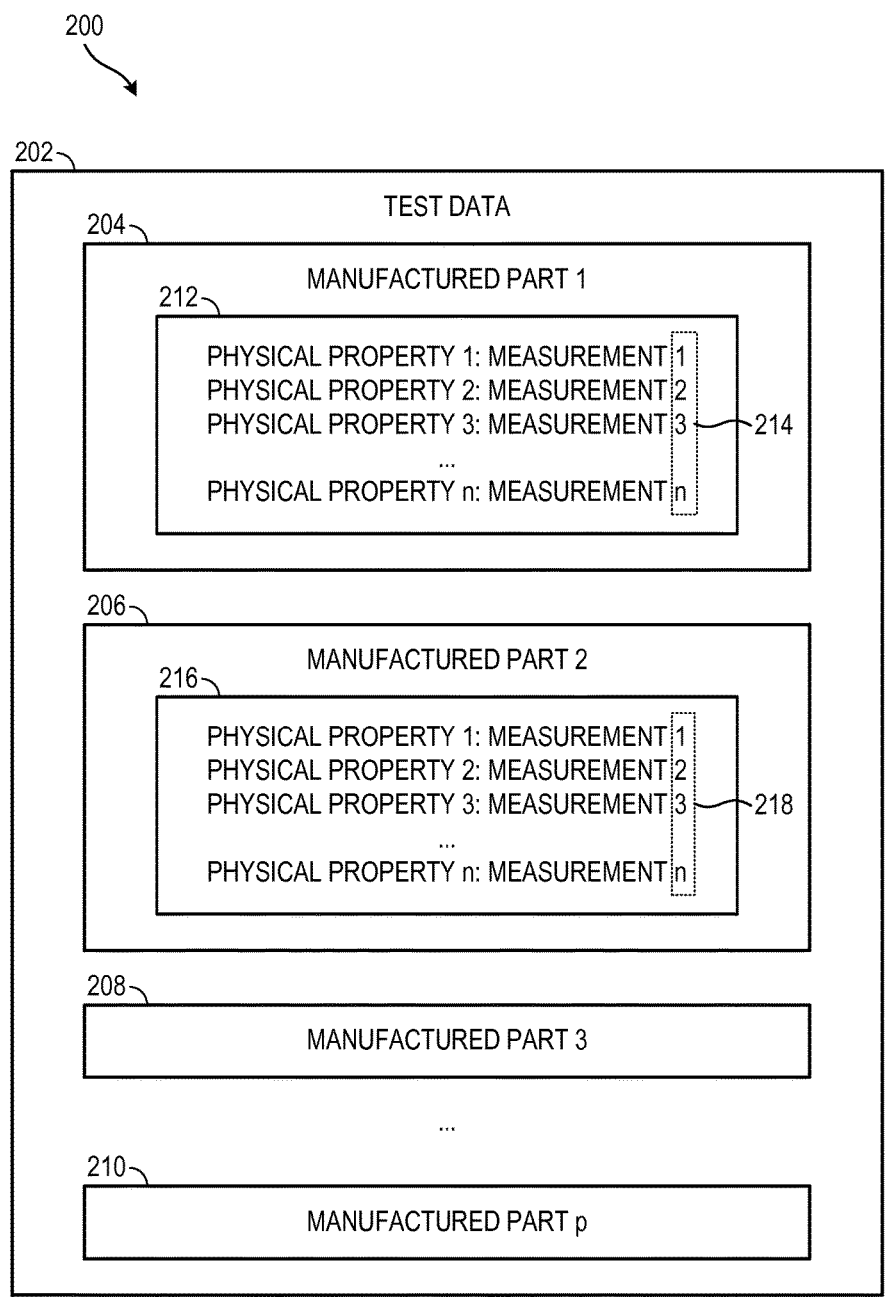
FIG. 2 shows an example of a structure for test data for a plurality of manufactured parts, in accordance with some embodiments.

FIG. 2 shows an example of a structure 200 for test data 202 for a plurality of manufactured parts, in accordance with some embodiments. In the example of FIG. 2, the test data 202 pertains to manufactured parts having the same nominal physical properties and differing from one another due to manufacturing imperfections. In practice, test data 202 can be a subset of a larger set of test data that can include manufacturing data for many different parts. The structure 200 shown in FIG. 2 is but one example, and other suitable examples can also be used.

Test data 202 can include a plurality of numerical values for each manufactured part. In the example of FIG. 2, test data 202 includes numerical values for manufactured parts numbered 1 (at 204), 2 (at 206), 3 (at 208), up to p (at 210).

The numerical values can correspond to measured values of physical properties of the corresponding manufactured part. For instance, for manufactured part 204, test data 202 can include data 212 that includes a total of n physical properties, and n corresponding measurement values 214 of the physical properties. In some examples, each of the n measurement values 214 can be taken from respective assembly line test stations. The measurement values from these test stations can be stored centrally, and accessed and analyzed by software to diagnose problems and improve manufacturing performance and efficiency. Similarly, for manufactured part 206, test data 202 can include data 216 that includes n measurement values 218 of the n physical properties. In some examples, the n physical properties are the same for all p parts 204, 206, 208, 210. In some examples, one or more parts may be missing one or more measurements.

Ideally, because all p manufactured parts have nominally the same physical properties (e.g., they are produced to be as close as possible to each other), p sets of measurement values can be relatively similar. Specifically, the p values of measurement 1 can be relatively close to one another, the p values of measurement 2 can be relatively close to one another, and so forth.

Each measurement (of the n measurements) can have its own particular statistical distribution. For instance, a particular measurement can have a historical mean value of 67 and a historical standard deviation of 0.1, (so that about 68% of the manufactured parts have a value between 67.9 and 68.1), while another measurement can have a historical mean value of 12 and a historical standard deviation of 1, (so that about 68% of the manufactured parts have a value between 11 and 13).

In order to accommodate the numerical variations, from physical property to physical property, it is beneficial to normalize the n measurements by their respective historical means and historical standard deviations (or, equivalently, their variances). Such normalization can readily show if a particular measurement is unusual, such as a measurement that lies beyond three times or four times a historical standard deviation.

Figure 3:
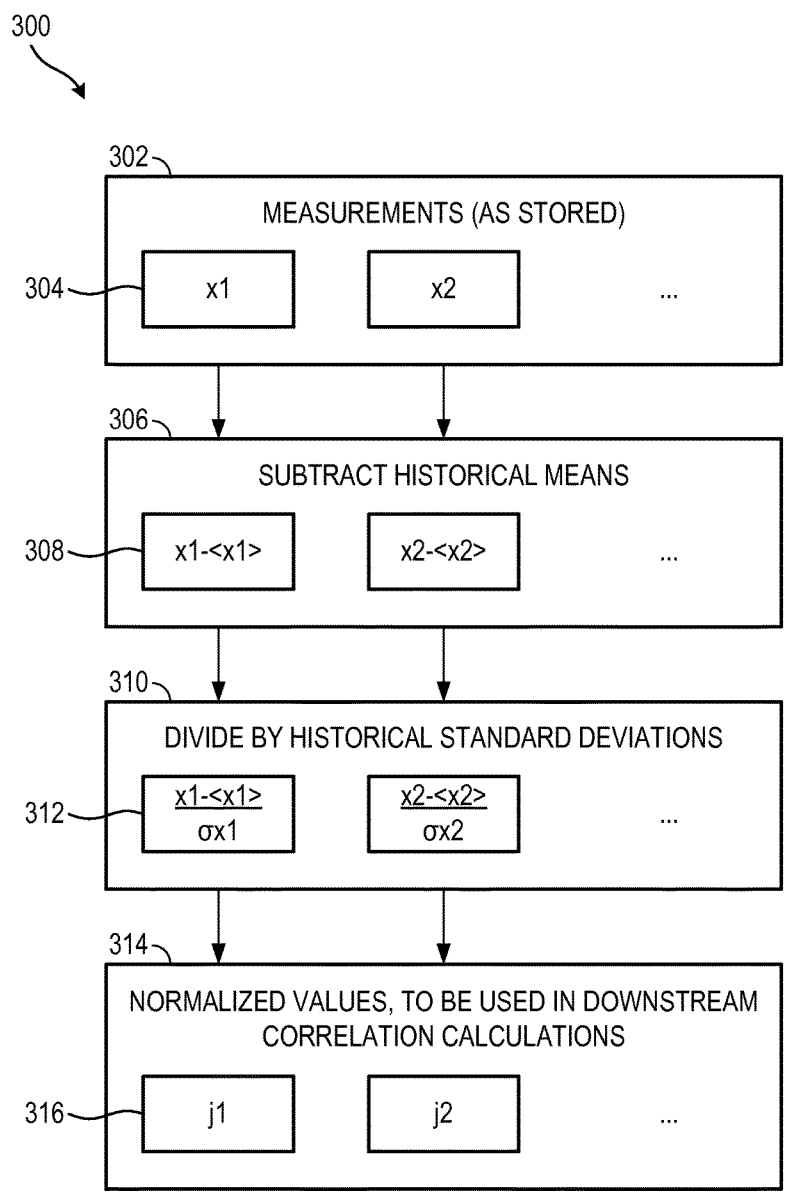
FIG. 3 shows an example of a normalization scheme for a particular set of measurements, in accordance with some embodiments.

FIG. 3 shows an example of a normalization scheme 300 for a particular set of measurements, such as 214 or 218 (FIG. 2), in accordance with some embodiments. Normalizing scheme 300 can normalize the retrieved test data against respective historical means and respective historical standard deviations to form normalized test data. The normalization scheme 300 can be carried out by the normalization module 110 (FIG. 1). The example of FIG. 3 is but one example; other suitable normalization schemes can also be used.

The measurements 302 can be stored as raw numerical values, such as values that are returned from particular pieces of test equipment or measurement equipment from a manufacturing assembly line. In this example, measurement 304 is denoted as $x_1$, which corresponds to a first physical quantity. Measurement $x_2$ corresponds to a second physical quantity, and so forth for all the measurements in 302.

At 306, measurements subtract their respective historical means. For example, quantity 308 is value $x_1$, minus historical mean value $<x_1>$. In some examples, the historical mean value can be stored on a server, optionally updated periodically, such as once a day. In other examples, the historical mean value can be calculated on the fly for a particular historical data set, such as for all the parts manufactured in the past week. In some examples, instead of a mean, another suitable quantity can be used to denote a center of a statistical distribution, such as a median value or others.

At 310, measurements divide by their respective historical standard deviations. For example, quantity 312 is $(x_1-<x_1>)$, divided by historical standard deviation $\sigma_{x1}$. The historical standard deviation can be calculated and stored in a manner similar to that of the historical mean value. In some examples, instead of a standard deviation, another suitable quantity can be used to denote a width of a statistical distribution, such as a variance, a full-width-at-half-maximum, a full-width-at-1/e^2-point, or others.

At 314, normalized values, such as quantity 416 ($j_1$), can be stored as normalized test data on a server, and can be used in downstream correlation calculations. The physical meaning of quantity 416, $j_1$, is that the particular measurement $x_1$ is $j_1$ standard deviations greater than the historical mean value. On average, for typical (normally distributed) manufacturing conditions, 68% of the normalized values ($x_1$, $x_2$, and so forth) are between −1 and +1, 95% are between −2 and +2, and 99.7% are between −3 and +3.

The normalization scheme 300 can be carried out by the normalization module 110 (FIG. 1), for each of the n measurements, for each of the n measured parts in the test data 202 (FIG. 2). After normalizing scheme 300 is executed, each manufactured part can have a respective set of normalized test data. Next, correlation module 112 (FIG. 1) can perform correlations of the normalized test data, to determine similarities between a particular manufactured part and other manufactured parts. The higher the correlation value between two parts, the closer the parts are in physical properties.

Figure 4:
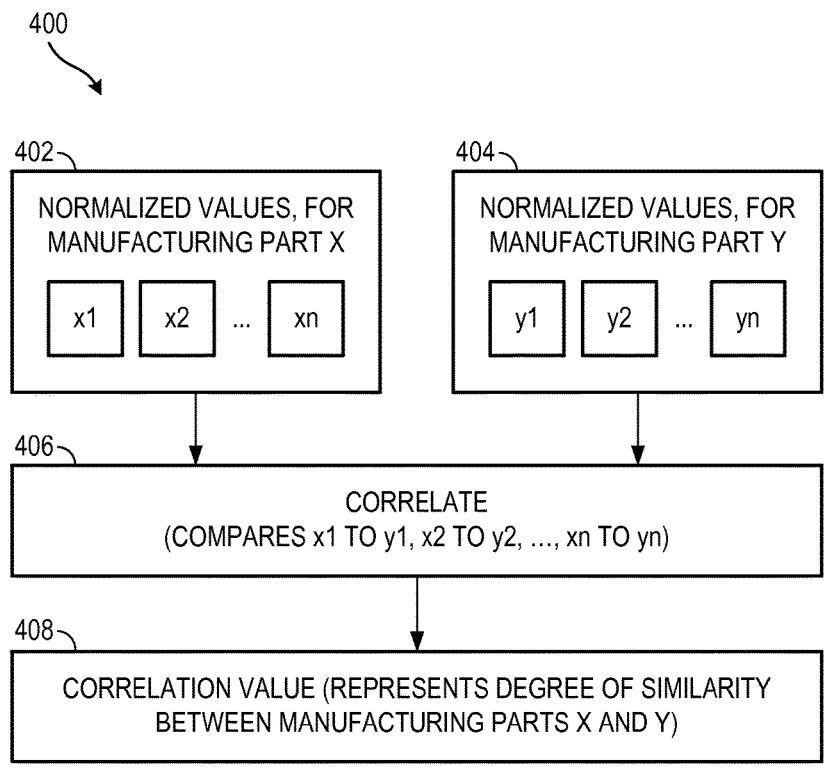
FIG. 4 shows an example of a correlation scheme to compare two sets of normalized measurements, in accordance with some embodiments.

FIG. 4 shows an example of a correlation scheme 400 to compare two sets of normalized measurements, in accordance with some embodiments. Correlation scheme 400 can correlate the normalized test data for a selected manufactured part with the normalized test data for each of the other manufactured parts in the plurality to form a plurality of correlation values. Each correlation value can represent a degree of similarity between the selected manufactured part and a respective manufactured part of the plurality. The correlation scheme 400 can be carried out by the correlation module 112 (FIG. 1). The example of FIG. 4 is but one example; other suitable correlation schemes can also be used.

Correlation scheme 400 calculates a numerical value that represents a similarity between two manufactured parts, denoted as X and Y in FIG. 4. Part X can be associated with normalized test data 402, which includes normalized values $x_1, x_2, \ldots, x_n$. Part Y can be associated with normalized test data 404, which includes normalized values $y_1, y_2, \ldots y_n$. Normalized test data 402, 404 can be stored in the measurements and calculation values 118 portion of the data layer of system 100 (FIG. 1).

Operation 406 correlates the normalized data sets 402 and 404 to produce a numerical correlation value 408. The correlation value 408 represents a degree of similarity between manufacturing parts X and Y.

In some examples, if parts X and Y are exactly the same, so that $x_1$ equals $y_1$, $x_2$ equals $y_2$, ..., and $x_n$, equals $y_n$, then the correlation value relating parts X and Y equals 1. As part X differs increasingly from part Y, the correlation value decreases from 1 toward 0.

An example of a quantity well-suited for correlating the normalized test data 402 (with data set $\{x_1, x_2, \ldots, x_n\}$) to normalized test data 404 (with data set $\{y_1, y_2, \ldots y_n\}$) is a Pearson's correlation coefficient, denoted by r or $r_{xy}$, and given by:

$$r = r_{xy} = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}},$$

where $$\bar{x} = \frac{1}{n}\sum_{i=1}^{n} x_i$$

and analogously for $\bar{y}$. The Pearson's correlation coefficient is but one example; other suitable correlation coefficients can also be used.

Although correlation coefficients typically vary in value from 1 (identical data sets) down to 0, other value conventions can also be used. For instance, the correlation coefficient can be calculated as a root mean square or a mean square value, which can equal 0 if the data sets are identical and can increase from 0 for increasingly different data sets. For instance, such a mean square calculation can be denoted by z, and given by:

$$z=(x_1-y_1)^2+(x_2-y_2)^2+\ldots+(x_n-y_n)^2$$

These are but examples; any suitable correlation coefficient or other figure of merit can be used to represent a degree of similarity between the selected manufactured part and a respective manufactured part of the plurality.

FIG. 5 shows an example of a portion of computer code 500, written in SQL, which can perform a correlation calculation, in accordance with some embodiments. The computer code 500, or other suitable computer code, can be executed by the correlation module 112 (FIG. 1) or by another suitable processor. The correlation calculation can be performed p times, comparing a selected measured part to each of the p measured parts in the test data 202 (FIG. 2). In some examples, the selected measured part need not be compared to itself, so there may be (p−1) comparisons. The p (or p−1) comparisons can produce p (or p−1) correlation values. Next, display module 114 (FIG. 1) can display, on a user interface, at least one of the plurality of correlation values and at least one identifier of a respective manufactured part.

Figure 6:
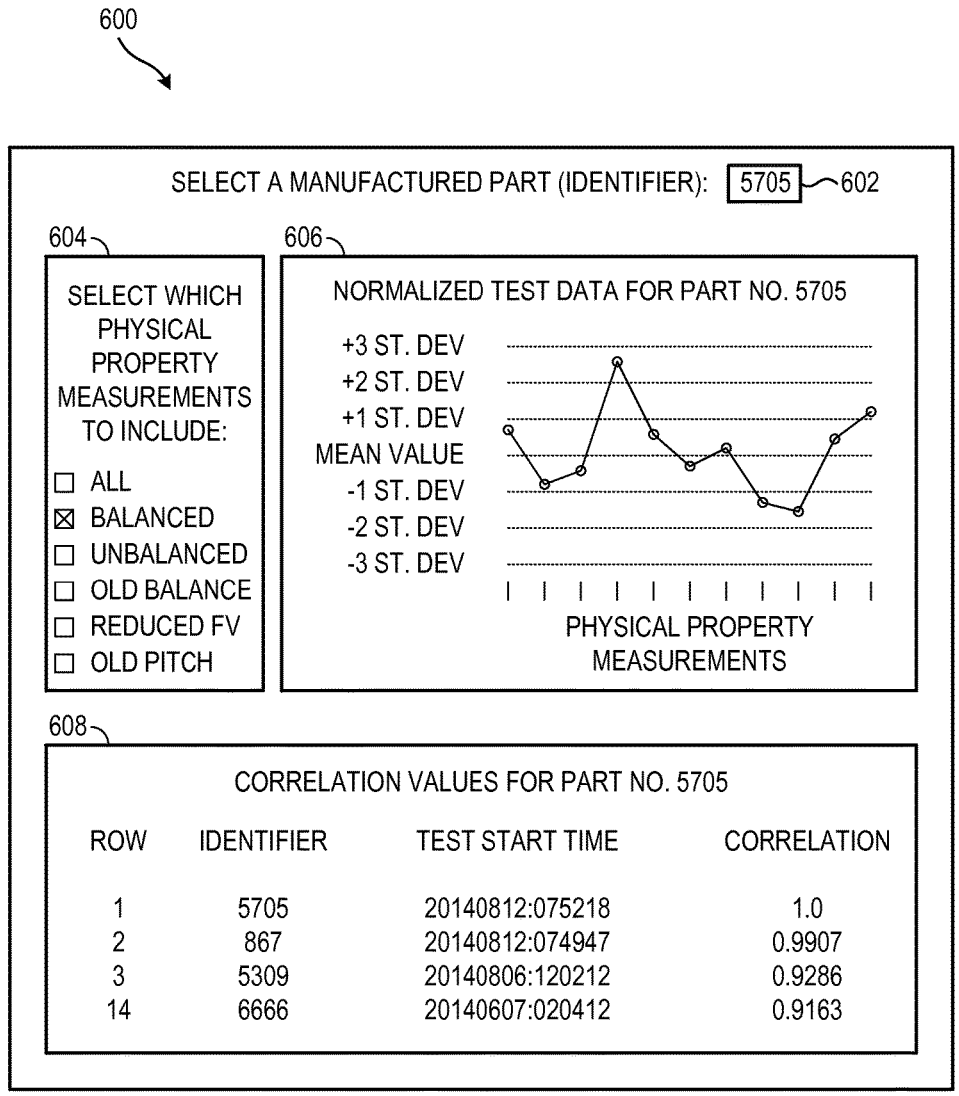
FIG. 6 shows an example of a user interface, in accordance with some embodiments.

FIG. 6 shows an example of a user interface 600, which can allow for selections from a user and can display at least one of the plurality of correlation values and at least one identifier of a respective manufactured part to the user, in accordance with some embodiments. User interface 600 is but one example; other suitable user interfaces can also be used.

User interface 600 can include a part selection element 602, which can receive, from the user, a selection of a selected manufactured part, from a plurality of manufactured parts. In the example of FIG. 6, part selection element 602 can include an area, into which a user can type an identifier associated with a particular manufactured part. In the example of FIG. 6, a user has entered identifier 5705, so that the system can analyze the manufactured part identified by number 5705. In other examples, the part selection element 602 can include a list of available parts, and can prompt a user to select a part from the list. Other suitable mechanisms can also be used to receive the selection of the selected manufactured part.

User interface 600 can include a physical property selection element 604, which can allow a user to specify which physical properties' measurements are included in the test data. In some examples, the physical property selection element 604 can include check boxes for each physical property, along with Check All and Uncheck All boxes, which can allow a user to select one or any combination of physical properties (and their corresponding measurements) to include in the test data. In some examples, such as in FIG. 6, the physical property selection element 604 can include categories, each of which can include more than one physical property. For instance, examples of categories can include Balanced, Unbalanced, Old Balance, Reduced Field of View, and Old Pitch. Each of these categories can refer to a particular group of quantities pertaining to the manufactured part.

User interface 600 can include a single-part console 606, which can visually display a plot of the normalized data for the specified manufactured part. In some examples, the single-part console 606 displays only the selected measurements from the physical property selection element 604. In other examples, the single-part console 606 displays all the measurements but highlights the selected measurements from the physical property selection element 604. In some examples, the single-part console 606 can allow a user to superimpose data from more than one manufactured part.

User interface 600 can include a results display 608, which can display at least one of the plurality of correlation values and at least one identifier of a respective manufactured part. In the example of FIG. 6, the results display 608 shows a row number, an identifier, a test start time, and a correlation value for the displayed manufactured parts. In the example of FIG. 6, the results display 608 shows results for parts having the highest-ranking correlation values. In the example of FIG. 6, the results are sorted by descending value of correlation value. In some examples, the results display 608 can allow for sorting by one of the other displayed quantities, by ascending or descending value. In some examples, the results display 608 can allow for selection of how many results to display, and can allow for scrolling through the displayed results.

Figure 7:
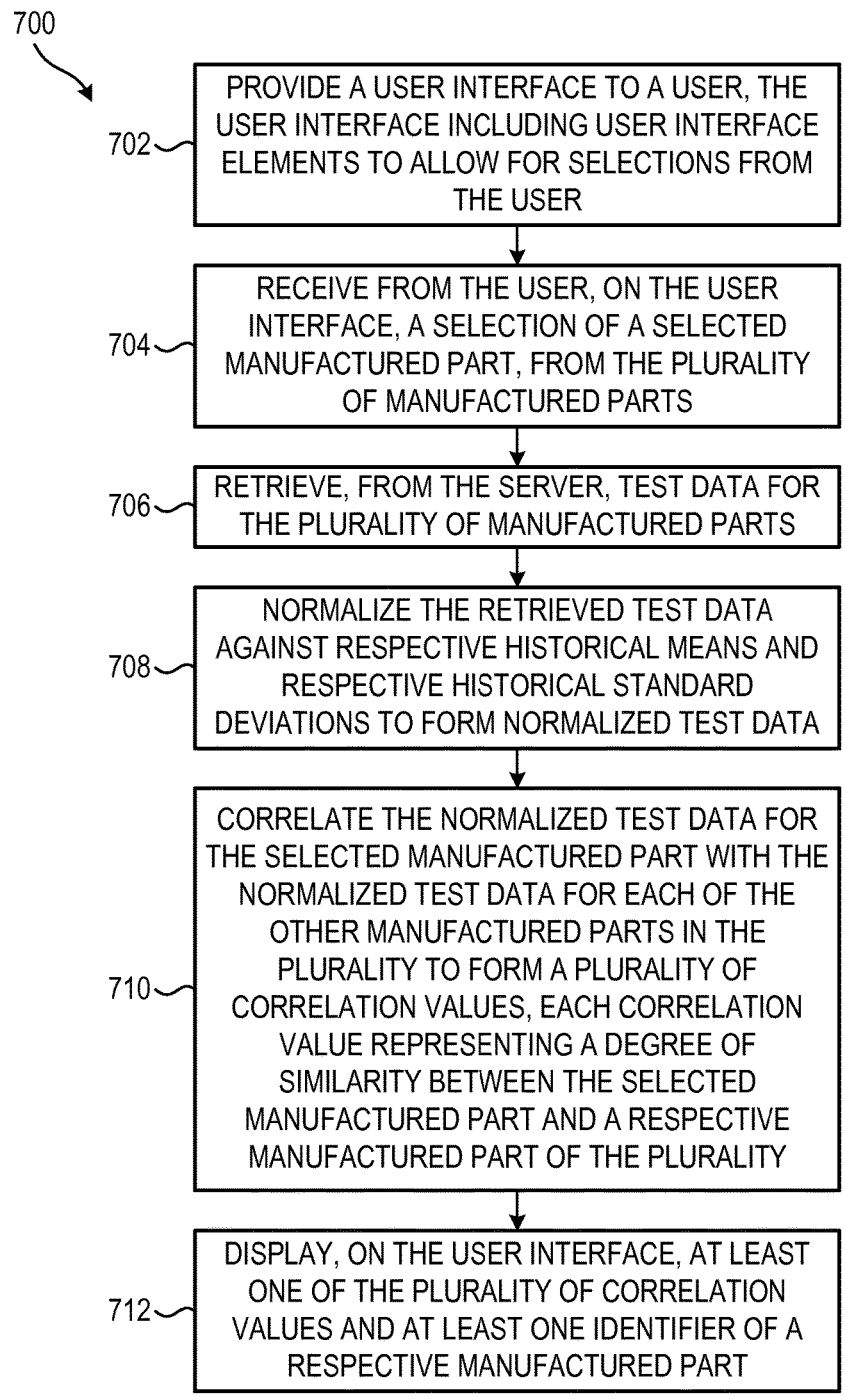
FIG. 7 shows an example of a method for identifying manufactured parts, in accordance with some examples.

FIG. 7 shows an example of a method 700 for identifying manufactured parts, in accordance with some examples. Method 700 can be executed on at least one processor executing instructions on a system, such as 100 (FIG. 1). Method 700 is but one method for identifying manufactured parts; other suitable methods can also be used.

At operation 702, the processor can provide a user interface to a user, the user interface including user interface elements to allow for selections from the user.

At operation 704, the processor can receive from the user, on the user interface, a selection of a selected manufactured part, from the plurality of manufactured parts.

At operation 706, the processor can retrieve, from the server, test data for the plurality of manufactured parts.

At operation 708, the processor can normalize the retrieved test data against respective historical means and respective historical standard deviations to form normalized test data.

At operation 710, the processor can correlating the normalized test data for the selected manufactured part with the normalized test data for each of the other manufactured parts in the plurality to form a plurality of correlation values. Each correlation value can represent a degree of similarity between the selected manufactured part and a respective manufactured part of the plurality.

At operation 712, the processor can display, on the user interface, at least one of the plurality of correlation values and at least one identifier of a respective manufactured part.

In some examples, method 700 can further include ranking the plurality of manufactured parts in descending order of correlation value. In some examples, method 700 can further include displaying, on the user interface, identifiers of the plurality of manufactured parts in the ranked order. In some examples, method 700 can further include designating highest-ranked manufactured parts as having the same failure mechanism as the selected manufactured part.

Some embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, a system or device may include one or more processors and may be configured with instructions stored on a computer-readable storage device.

What is claimed is:

1. A system for identifying manufactured parts, comprising:
a server configured to store test data for a plurality of manufactured parts, the plurality of manufactured parts having same nominal physical properties and differing from one another due to manufacturing imperfections;
a processor; and
memory, including instructions that, when executed on the processor, configure the processor to:
provide a user interface, the user interface including user interface elements to allow for selections;
receive, as input on the user interface, a selection of a selected manufactured part, from the plurality of manufactured parts;
retrieve, from the server, test data for the plurality of manufactured parts, the test data comprising a plurality of numerical values for each manufactured part that quantify the manufacturing imperfections for the manufactured part;
normalize the retrieved test data against respective historical means and respective historical standard deviations to form normalized test data;
correlate the normalized test data for the selected manufactured part with the normalized test data for each of the other manufactured parts in the plurality to form a plurality of correlation values, each correlation value representing a degree of similarity between the selected manufactured part and a respective manufactured part of the plurality;
rank the plurality of manufactured parts in descending order of correlation value;
display, on the user interface, identifiers of the plurality of manufactured parts in the ranked order; and
designate, on the user interface, highest-ranked manufactured parts;
wherein the highest-ranking manufactured parts have a same or similar failure mechanism as the selected manufactured part based on the quantified manufacturing imperfections.

2. The system of claim 1, wherein the user interface is further configured to receive a selection that specifies which physical properties measurements are included in the test data.

3. The system of claim 1, wherein correlating the normalized test data for the selected manufactured part against the normalized test data for each of the other manufactured parts in the plurality to form a plurality of correlation values comprises:
performing a Pearson correlation between the normalized test data for the selected manufactured part and the normalized test data for each of the other manufactured parts in the plurality to form the plurality of correlation values, the plurality of correlation values being Pearson's correlation coefficients.

4. The system of claim 3, wherein normalizing the retrieved test data against respective historical means and respective historical standard deviations to form normalized test data comprises, for each numerical value:
subtracting a respective historical mean from the numerical value, then dividing by a respective standard deviation to form the respective entry in the corresponding normalized test data.

5. A method for identifying manufactured parts, the method comprising using at least one computer processor to perform instructions, the instructions comprising:
providing a user interface, the user interface including user interface elements to allow for selections;
receiving, as input on the user interface, a selection of a selected manufactured part, from a plurality of manufactured parts;
retrieving, from a server, test data for the plurality of manufactured parts, the test data comprising a plurality of numerical values for each manufactured part that quantify manufacturing imperfections for the manufactured part;
normalizing the retrieved test data against respective historical means and respective historical standard deviations to form normalized test data;
correlating the normalized test data for the selected manufactured part with the normalized test data for each of the other manufactured parts in the plurality to form a plurality of correlation values, each correlation value representing a degree of similarity between the selected manufactured part and a respective manufactured part of the plurality;
ranking the plurality of manufactured parts in descending order of correlation value;
displaying, on the user interface, identifiers of the plurality of manufactured parts in the ranked order; and
designating, on the user interface, highest-ranked manufactured parts;
wherein the highest-ranking manufactured parts have a same or similar failure mechanism as the selected manufactured part based on the quantified manufacturing imperfections.

6. The method of claim 5, wherein the user interface is further configured to receive a selection that specifies which physical properties measurements are included in the test data.

7. The method of claim 5, wherein correlating the normalized test data for the selected manufactured part against the normalized test data for each of the other manufactured parts in the plurality to form a plurality of correlation values comprises:
performing a Pearson correlation between the normalized test data for the selected manufactured part and the normalized test data for each of the other manufactured parts in the plurality to form the plurality of correlation values, the plurality of correlation values being Pearson's correlation coefficients.

8. The method of claim 7, wherein normalizing the retrieved test data against respective historical means and respective historical standard deviations to form normalized test data comprises, for each numerical value:
subtracting a respective historical mean from the numerical value, then dividing by a respective standard deviation to form the respective entry in the corresponding normalized test data.

9. A non-transitory machine-readable medium, including instructions, which when executed by the machine, cause the machine to perform operations for identifying manufactured parts, the operations to configure one or more processors or the machine to:
provide a user interface, the user interface including user interface elements to allow for selections;
receive, as input on the user interface, a selection of a selected manufactured part, from a plurality of manufactured parts;
retrieve, from a server, test data for the plurality of manufactured parts, the test data comprising a plurality of numerical values for each manufactured part that quantify manufacturing imperfections for the manufactured part;
normalize the retrieved test data against respective historical means and respective historical standard deviations to form normalized test data;
correlate the normalized test data for the selected manufactured part with the normalized test data for each of the other manufactured parts in the plurality to form a plurality of correlation values, each correlation value representing a degree of similarity between the selected manufactured part and a respective manufactured part of the plurality;
rank the plurality of manufactured parts in descending order of correlation value;
display, on the user interface, identifiers of the plurality of manufactured parts in the ranked order; and
designate, on the user interface, highest-ranked manufactured parts;
wherein the highest-ranking manufactured parts have a same or similar failure mechanism as the selected manufactured part based on the quantified manufacturing imperfections.

10. The machine-readable medium of claim 9, wherein the user interface is further configured to receive a selection that specifies which physical properties measurements are included in the test data.

11. The machine-readable medium of claim 9, wherein correlating the normalized test data for the selected manufactured part against the normalized test data for each of the other manufactured parts in the plurality to form a plurality of correlation values comprises:
  performing a Pearson correlation between the normalized test data for the selected manufactured part and the normalized test data for each of the other manufactured parts in the plurality to form the plurality of correlation values, the plurality of correlation values being Pearson's correlation coefficients.

12. The machine-readable medium of claim 11, wherein normalizing the retrieved test data against respective historical means and respective historical standard deviations to form normalized test data comprises, for each numerical value:
  subtracting a respective historical mean from the numerical value, then dividing by a respective standard deviation to form the respective entry in the corresponding normalized test data.

* * * * *

UNITED STATES PATENT AND TRADEMARK OFFICE
CERTIFICATE OF CORRECTION

PATENT NO. : 10,338,574 B2  
APPLICATION NO. : 14/859896  
DATED : July 2, 2019  
INVENTOR(S) : David Hughes Page 1 of 2

It is certified that error appears in the above-identified patent and that said Letters Patent is hereby corrected as shown below:

In the Drawings

On sheet 3 of 7, Fig. 3, reference numeral 304, delete "x1" and insert --$x_1$-- therefor On sheet 3 of 7, Fig. 3, reference numeral 304, delete "x2" and insert --$x_2$-- therefor On sheet 3 of 7, Fig. 3, reference numeral 308, delete "x1-<x1>" and insert --$x_1$-<$x_1$>-- therefor On sheet 3 of 7, Fig. 3, reference numeral 308, delete "x2-<x2>" and insert --$x_2$-<$x_2$>-- therefor On sheet 3 of 7, Fig. 3, reference numeral 312, delete " $\frac{x1-<x1>}{\sigma x1}$ " and insert -- $\frac{x_1-<x_1>}{\sigma_{x_1}}$ -- therefor On sheet 3 of 7, Fig. 3, reference numeral 312, delete " $\frac{x2-<x2>}{\sigma x2}$ " and insert -- $\frac{x_2-<x_2>}{\sigma_{x_2}}$ -- therefor On sheet 3 of 7, Fig. 3, reference numeral 316, delete "j1" and insert --$j_1$-- therefor On sheet 3 of 7, Fig. 3, reference numeral 316, delete "j2" and insert --$j_2$-- therefor On sheet 4 of 7, Fig. 4, reference numeral 402, delete "x1" and insert --$x_1$-- therefor On sheet 4 of 7, Fig. 4, reference numeral 402, delete "x2" and insert --$x_2$-- therefor On sheet 4 of 7, Fig. 4, reference numeral 402, delete "xn" and insert --$x_n$-- therefor Signed and Sealed this  
Nineteenth Day of January, 2021

Andrei Iancu  
*Director of the United States Patent and Trademark Office*

CERTIFICATE OF CORRECTION (continued)
U.S. Pat. No. 10,338,574 B2

On sheet 4 of 7, Fig. 4, reference numeral 404, delete "y1" and insert --$y_1$-- therefor On sheet 4 of 7, Fig. 4, reference numeral 404, delete "y2" and insert --$y_2$-- therefor On sheet 4 of 7, Fig. 4, reference numeral 404, delete "yn" and insert --$y_n$-- therefor On sheet 4 of 7, Fig. 4, reference numeral 406, Line 2, delete "x1 TO y1, x2 TO y2, ..., xn TO yn)" and insert --$x_1$ TO $y_1$, $x_2$ TO $y_2$, ..., $x_n$ TO $y_n$)-- therefor In the Specification In Column 3, Line 8, delete "102" and insert --104-- therefor In Column 5, Line 24, delete "416" and insert --316-- therefor In Column 5, Line 27, delete "416," and insert --316,-- therefor In Column 6, Line 4, delete "$x_n$," and insert --$x_n$-- therefor